United States Patent [19]

Shuert

[11] Patent Number: 5,133,460
[45] Date of Patent: * Jul. 28, 1992

[54] BULK CONTAINER

[76] Inventor: Lyle H. Shuert, 1034 Stratford Pl., Bloomfield Hills, Mich. 48013

[*] Notice: The portion of the term of this patent subsequent to Feb. 5, 2008 has been disclaimed.

[21] Appl. No.: 650,034

[22] Filed: Feb. 4, 1991

Related U.S. Application Data

[63] Continuation-in-part of Ser. No. 489,331, Mar. 5, 1990, Pat. No. 4,989,731.

[51] Int. Cl.⁵ .............................................. B65D 19/06
[52] U.S. Cl. .................................... 206/600; 108/55.1; 206/386; 206/524.2; 220/461; 493/96
[58] Field of Search .................... 108/51.3, 55.1, 55.3, 108/55.5, 56.1; 206/524.2, 524.3, 595–600, 386; 220/461, 462; 229/3.5 R, 23 R; 156/90, 182, 196, 292; 493/89, 95, 96, 99

[56] References Cited

U.S. PATENT DOCUMENTS

| | | |
|---|---|---|
| 2,893,588 | 7/1959 | Martin . |
| 2,918,190 | 12/1959 | Martin . |
| 3,194,471 | 7/1965 | Murphy ................................ 220/462 |
| 3,478,914 | 11/1969 | Williams . |
| 3,502,237 | 4/1970 | Verhein et al. . |
| 3,664,570 | 5/1972 | Kupersmit ........................ 229/23 R |
| 3,726,467 | 4/1973 | Shepherd ........................ 229/23 R |
| 3,797,727 | 3/1974 | Downing et al. ................ 229/23 A |
| 3,986,659 | 10/1976 | Vajtay . |
| 4,013,168 | 3/1977 | Bamburg et al. .................... 206/598 |
| 4,141,466 | 2/1979 | Gordon et al. ...................... 220/462 |
| 4,177,935 | 12/1979 | Centanni .............................. 493/96 |
| 4,413,737 | 11/1983 | Wind .................................. 206/599 |
| 4,504,497 | 3/1985 | Kurth et al. . |
| 4,550,830 | 11/1985 | Shuert ................................ 206/386 |
| 4,610,885 | 9/1986 | Tait .................................... 220/462 |
| 4,693,413 | 9/1987 | McFarland et al. .............. 229/23 R |
| 4,742,781 | 5/1988 | Shuert ................................ 108/53.3 |
| 4,756,417 | 7/1988 | Teixeira ............................ 206/386 |
| 4,765,252 | 8/1988 | Shuert ................................ 108/55.1 |
| 4,838,418 | 6/1989 | Teixeira ............................ 206/386 |

FOREIGN PATENT DOCUMENTS

86/05464 9/1986 PCT Int'l Appl. .................. 206/600

Primary Examiner—Jimmy G. Foster
Attorney, Agent, or Firm—Krass & Young

[57] ABSTRACT

A container especially suitable for bulk materials and including a cardboard tubular sleeve having its lower edge portion positioned in upwardly opening groove means on a plastic pallet. The tubular sleeve is a sleeve assembly comprising inner and outer tubular sleeves respectively formed of first and second corrugated cardboard structures with the inner sleeve positioned telescopically within the outer sleeve and with the outer annular surface of the inner sleeve secured to the inner annular surface of the outer sleeve to form a composite sleeve assembly having a thickness approximately the width of the groove means on the pallet. An auxiliary cardboard sheet is secured to the outboard surface of the outer tubular sleeve and an auxiliary cardboard sheet is secured to the inboard surface of the inner cardboard sleeve. A vinyl sheet is adhesively secured to the auxiliary cardboard sheet of the outer tubular sleeve and a further vinyl sheet is adhesively secured to the auxiliary cardboard sheet of the inner tubular sleeve so that, with the inner and outer tubular sleeves telescopically assembled, the vinyl sheets form the inner and outer annular surfaces of the composite sleeve assembly. The vinyl sheets also cover the upper and lower annular end edges of the sleeve assembly so as to make the sleeve assembly substantially moisture impervious. Also disclosed is a method for folding the sleeve assembly into a totally flat collapsed configuration to facilitate storage and shipment.

9 Claims, 10 Drawing Sheets

BULK CONTAINER

RELATED APPLICATION

This application is a continuation-in-part of U.S. patent application Ser. No. 489,331 filed on Mar. 5, 1990, now U.S. Pat. No. 4,989,731.

FIELD OF THE INVENTION

This invention relates to containers and more particularly to containers that are especially suitable for use with bulk materials.

Although a plurality of diverse containers are available in the marketplace, few if any of the available containers are totally suitable for use in shipping and storing bulk materials. Bulk materials pose peculiar requirements with respect to containers since their flow patterns and their angle of repose create extremely high bursting pressures especially in the lower regions of the material within the container. Containers for discrete, free standing articles, by comparison, need only contain the discrete articles, and in general need not deal with the extremely high bursting pressures present in the case of bulk materials.

SUMMARY OF THE INVENTION

This invention is directed to the provision of an improved container.

More specifically, this invention is directed to the provision of a bulk container which is simple and inexpensive in design and yet which successfully withstands the extremely high burst pressures generated by stored bulk materials.

The invention container is of the type comprising a rigid plastic pallet and a tubular sleeve adapted to be supported in upstanding fashion on the upper face of the pallet to form the container. According to the invention, the wall of the sleeve has a sandwich cross-sectional construction including an inner plastic layer, a central cardboard layer, and an outer plastic layer. This sandwich construction for the sleeve allows the use of inexpensive and readily available cardboard and plastic materials to form the sleeve while providing a strong moisture impervious construction for the sleeve.

According to a further feature of the invention, the central cardboard layer comprises a corrugated cardboard layer. This arrangement allows the use of readily available and inexpensive corrugated cardboard materials to form the sleeve.

According to a further feature of the invention, the inner and outer plastic layers comprise vinyl layers. This arrangement allows the use of readily available vinyl sheets to be employed in combination with the readily available corrugated cardboard to form the sleeve assembly.

According to a further feature of the invention, the plastic layers further cover the upper and lower annular end edges of the sleeve. This arrangement provides a moisture impervious construction for the sleeve so as to allow outdoor storage of the sleeve and enhance the usability and reusability of the sleeve in applications, such as food handling, where sanitation is important.

According to a further feature of the invention, the central cardboard layer comprises inner and outer tubular sleeves respectively formed as first and second corrugated cardboard structures with the inner sleeve positioned telescopically within the outer sleeve and with the outer annular surface of the inner sleeve secured to the inner annular surface of the outer sleeve to form a composite sleeve assembly. This construction provides a sleeve assembly employing simple, inexpensive plastic and cardboard materials and yet which is able to withstand the extremely high bursting pressures generated by stored bulk materials.

According to a further feature of the invention, the inner and outer cardboard structures each comprise two cardboard panels arranged end-to-end; one cardboard panel of the outer cardboard structure is secured to one panel of the inner cardboard structure in staggered relation and the secured panels are formed into a first partial sleeve assembly; the other cardboard panel of the outer cardboard structure is secured to the other panel of the inner cardboard structure in staggered relation and the secured panels are formed into a second partial sleeve assembly; and the first and second partial sleeve assemblies are brought together in interfitting fashion to form the sleeve assembly. This arrangement provides a simple and efficient method of constructing the sleeve assemblies and results in a sleeve assembly with staggered seams to augment the overall strength of the sleeve assembly.

According to a further feature of the invention, the pallet includes downwardly opening tunnels extending across the lower face thereof for receipt of the forks of a forklift truck and groove means are defined around the periphery of the upper face of the pallet over the tunnels for receipt of the lower edge of the sleeve. This arrangement provides a simple and effective means of providing means for receipt of the lower edge of the sleeve and simultaneously provides the requisite tunnels for receipt of the forks of a forklift truck.

According to a further feature of the invention, co-acting means are provided to releasably secure the sleeve to the pallet, the coacting means comprise slots in the lower peripheral edge of the sleeve and a plurality of latch members mounted on the upper face of the pallet over the tunnels, and the vinyl sheets forming the inner and outer plastic layers of the sleeve assembly further serve to provide a lining for the slots in the sleeve. This arrangement further augments the moisture impervious character of the sleeve and augments the durability of the slots.

According to a further feature of the invention, a method is provided for selectively creasing the sleeve material at longitudinally spaced locations so as to facilitate the folding of the sleeve material into a tubular configuration and so as to allow the sleeve to be readily folded through 180° into a totally flat configuration to facilitate storage and shipping of the sleeve.

DETAILED DESCRIPTION OF THE PREFERRED EMBODIMENT

Figure 1:
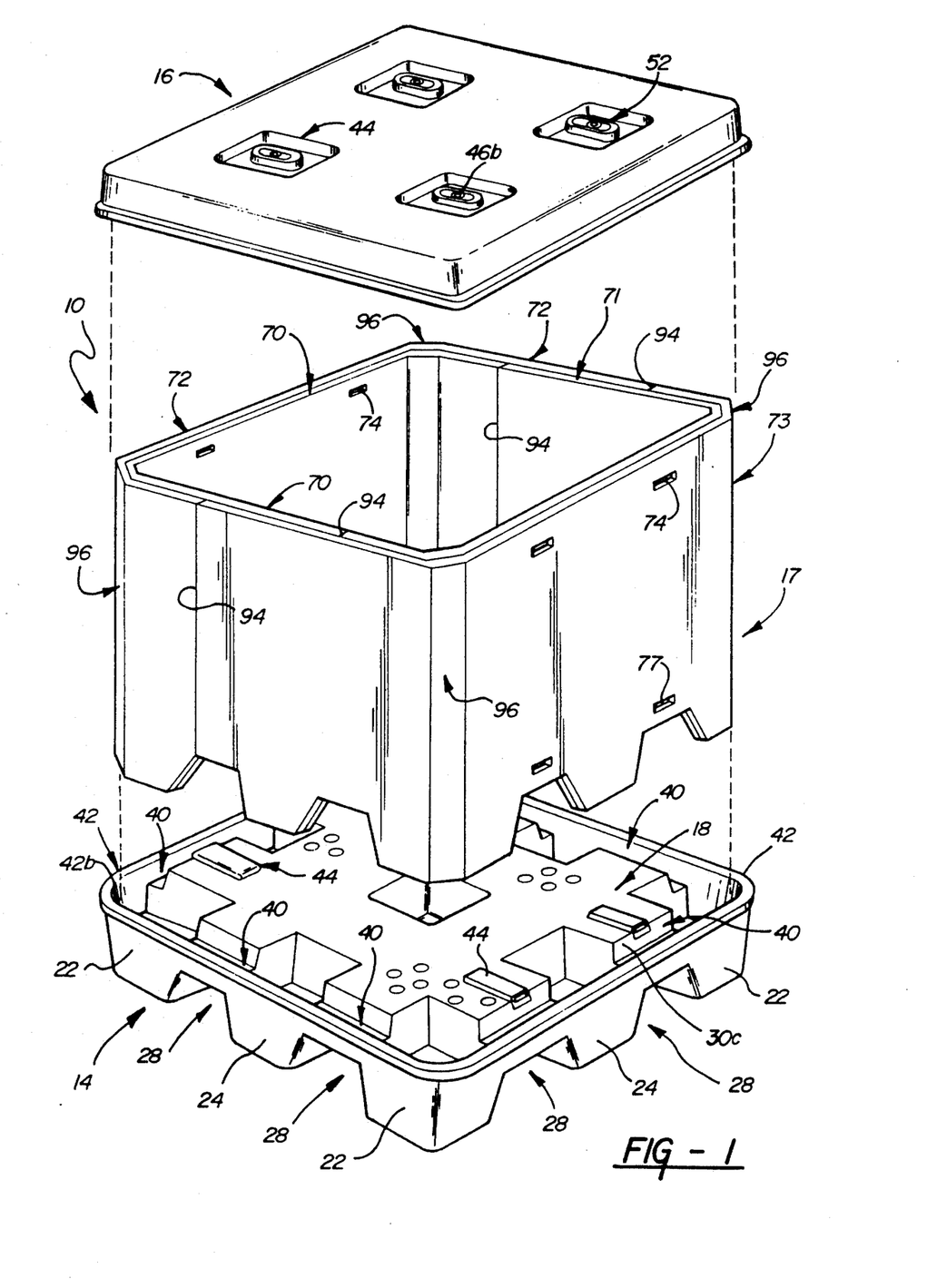
FIG. 1 is an exploded perspective view of the invention container.

The container 10 seen in FIG. 1 is a composite plastic and cardboard design employing a pallet 14, an upper unit or lid 16, and a sleeve assembly 17.

The pallet 14 and lid 16 are formed of a plastic material and are preferably formed of sheets of organic polymeric material such as polyethylene. Pallet 14 and lid 16 preferably employ a twin sheet construction employing two sheets which are vacuum formed and then fused or knitted together at various points to add structural rigidity.

Figure 3:
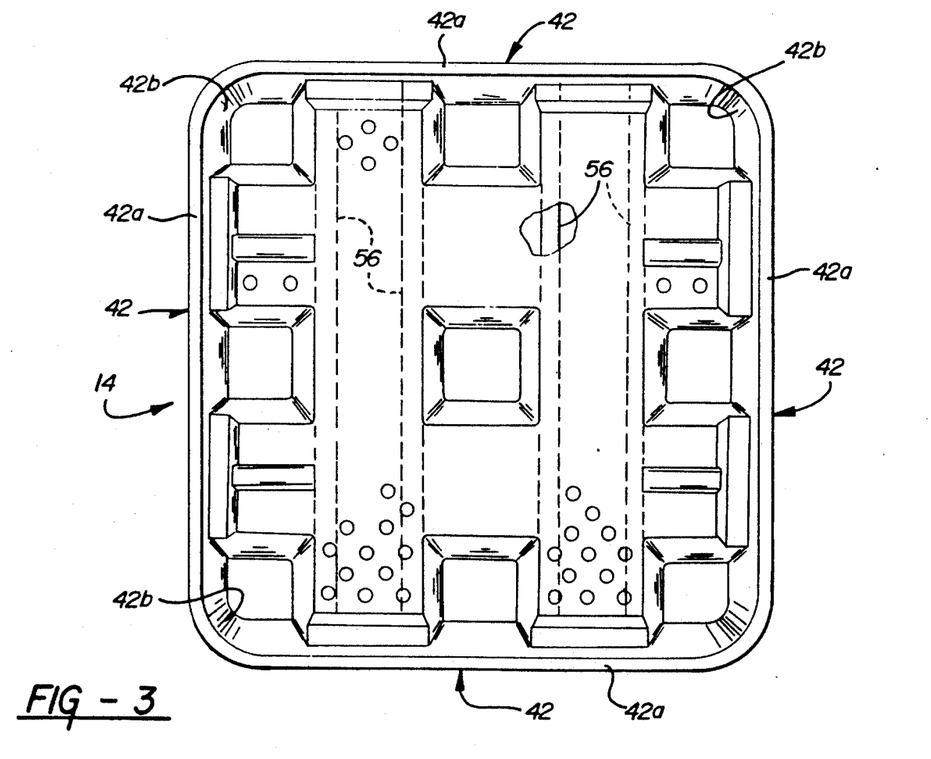
FIG. 3 is a top plan view of a pallet utilized in the invention container.

Pallet 14 is generally planar and includes a flat platform structure 18, defining a flat upper load face 20, and a plurality of hollow legs extending downwardly from platform structure 18 and opening in upper face 18. As shown, corner legs 22 are provided at each corner of the pallet, intermediate legs 24 are provided at an intermediate location along each side of the pallet, and a central leg 26 is provided centrally of the pallet. Legs 22, 24 and 26 will be seen to cooperate to define tunnels or indentations 28 extending transversely and longitudinally across the lower face of the pallet to provide relieved access areas for receiving the forks of a forklift truck or the like. As a consequence, the container may be lifted and moved by conventional warehousing equipment.

Figure 5:
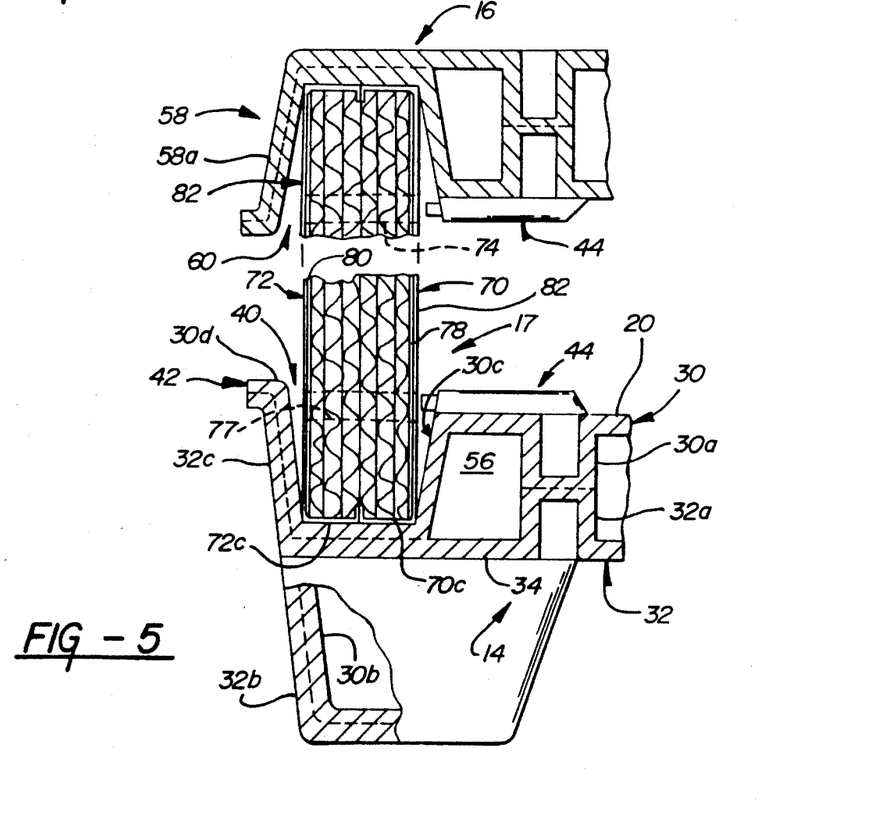
FIG. 5 is a fragmentary cross sectional view illustrating the cooperative interaction of the invention sleeve assembly, the invention pallet, and the invention lid.

Pallet 14 includes an upper vacuum formed sheet 30 forming the upper face 20 of the platform structure 18 and a lower vacuum formed sheet 32 forming the lower face 34 of the platform structure 18. Upper sheet 30 includes a plurality of downwardly extending protrusions 30a which are knitted or fused to upwardly extending protrusions 32a on lower sheet 32 to form the platform structure 18. Further details of this protrusion structure are shown in U.S. Pat. No. 4,879,956 assigned to the assignee of the present application. Sheets 30 and 32 also include leg portions 30b, 32b, respectively, which are fused or knitted together to form the legs 22, 24 and 26.

Upper sheet 30 further includes a plurality of circumferentially spaced upwardly opening U-shaped edge portions 30c positioned over each tunnel 28 and coacting to define a plurality of upwardly opening groove means 40 spaced circumferentially around the periphery of the pallet. Sheets 30,32 also include outer upwardly extending portions 30d,32c fused together to form a continuous rim 42 extending around the periphery of the pallet. Rim 42 is configured to define side wall portions 42a along the four sides of the pallet and angled or rounded corner portions 42b at each corner of the pallet extending on a bias across the corners of the pallet between adjacent rim sides 42a.

The various fuse or knit lines as between the upper sheet 30 and the lower sheet 32 are indicated by dash lines in the drawings.

A plurality of latch assemblies 44 are provided on pallet 14 at circumferentially spaced locations thereabout. For example, a pair of latch assemblies 44 may be provided along two opposite sides of the pallet with each latch assembly located over a tunnel 28 and therefor in association with a groove means 40. Each latch assembly 44 includes a latch member 46 mounted on the pallet for detented sliding movement between a retracted position in which the related sleeve assembly edge is free to enter or leave the related groove means 40 and an extended or locking position in which the tip of the latch member extends across the groove means.

Figure 8:
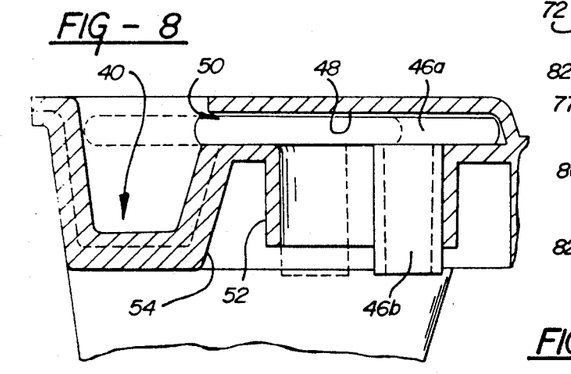
FIGS. 8-10 are detailed views illustrating a latch mechanism employed in the invention container.
Figure 9:
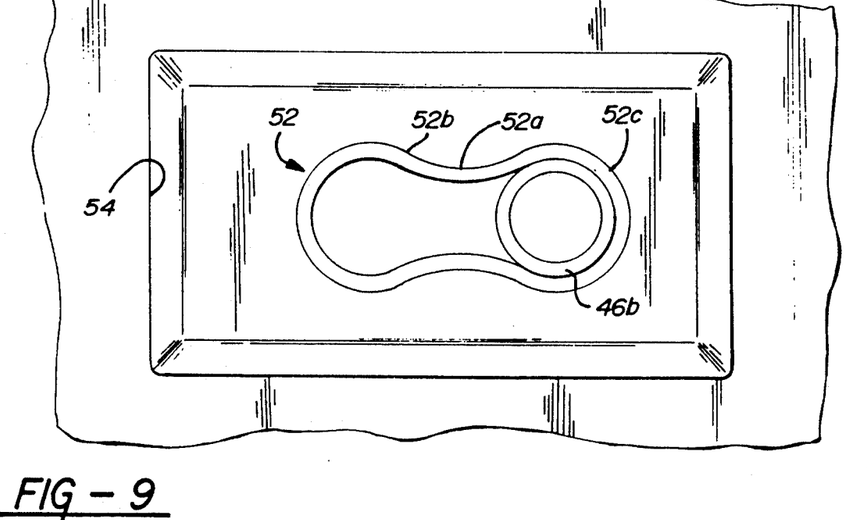
Figure 10:
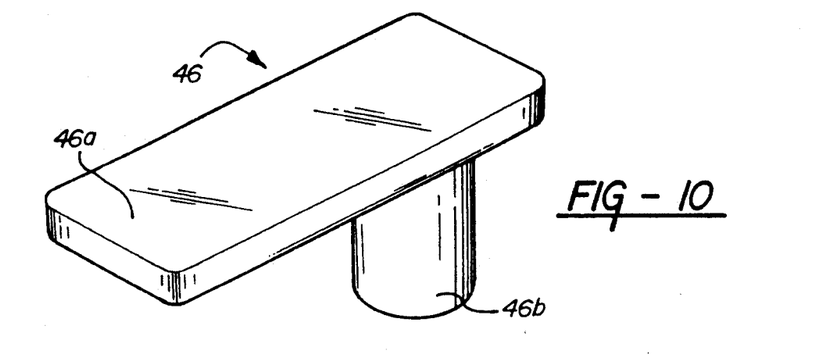

Latch members 46 are preferably formed of the same plastic material as the pallet and each includes a main body portion 46a in the form of a elongated plate and a tubular handle or actuator portion 46b formed integrally with main body portion 46a adjacent one end thereof. Latch members 46 are slidably positioned between the upper and lower sheets 30,32 of the pallet. Specifically, the upper and lower sheets are configured to define slideways 48 extending perpendicularly inwardly from groove means 40 and opening at their outboard ends 50 in these groove means. Latch members 46 are positioned in slideways 48 with latch handle portions 46b received in detent structures 52 formed integrally with the lower sheet 32 of the pallet and disposed in downwardly opening hollows or depressions 54 formed in the lower sheet at the outboard ends of the tunnels 28 between adjacent pallet legs. Detent structures 52 have a generally figure eight formation with the neck 52a at the juncture of the two halves 52b,52c of the detent dimensioned to be slightly smaller than the external diameter of latch handle portion 46d so that the handle portion 46b passes snappingly between detent halves 42b and 42c as the latch moves between its retracted and extended positions in response to a pull or push exerted by a finger or fingers inserted into the open end of handle portion 46b.

Pallet 14 is preferably formed in a twin sheet press in which the two sheets 30,32 are individually vacuum formed and thereafter fused or knitted together to form the double wall structure. The pallet also preferably includes a plurality of tubular steel members 56, of rectangular cross section, positioned between the upper and lower sheets 30,32 and extending in parallel spaced relation across the full width of the pallet to augment the structural rigidity of the pallet.

Figure 4:
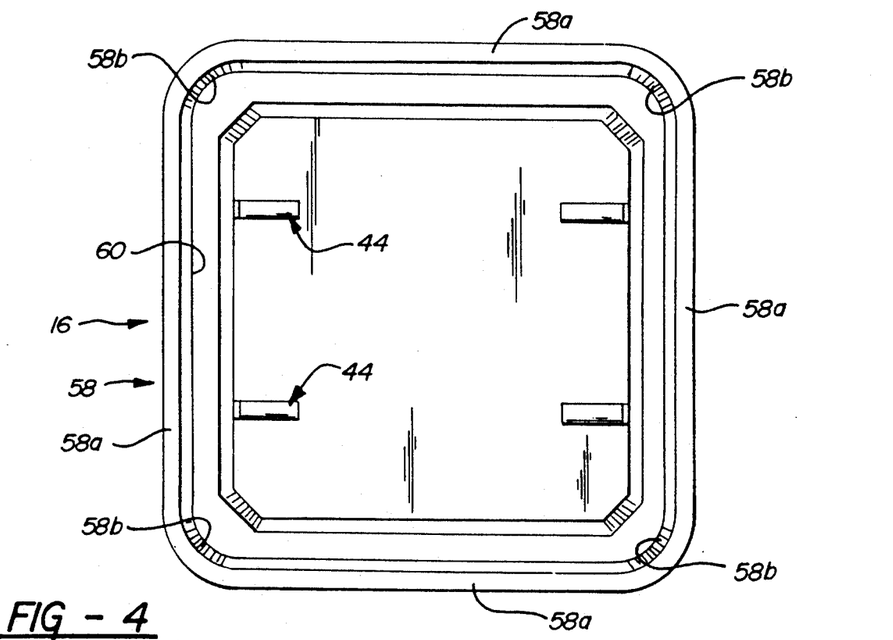
FIG. 4 is a bottom plan view of a lid utilized in the invention container.

Lid 16 is a planar twin sheet vacuum formed structure and is devoid of the legs of the pallet 14 and thereby devoid of the tunnels formed between the legs of the pallet. Lid 16 defines a rim 58 extending continuously around the periphery of the lid and defining the outer wall or border of a downwardly opening groove 60 extending continuously around the periphery of the lid. Rim 58 is configured to define side wall portions 58a along the four sides of the lid and angled or rounded corner portions 58b at each corner of the lid extending on a bias across the corners of the lid between adjacent lid sides 58a.

Lid 16 further includes latch assemblies 44 on the lower face of the lid identical to the latch assemblies utilized on pallet 14. The latch assemblies 44 provided on the lower face of lid 16 correspond in number and circumferential positioning to the latch assemblies provided on the upper face of the pallet 14. The latch members 46 of the lid latch assemblies are positioned between a retracted position in which they are disposed inboard of the groove 60 and an extended latching position in which they extend across the groove.

Figure 2:
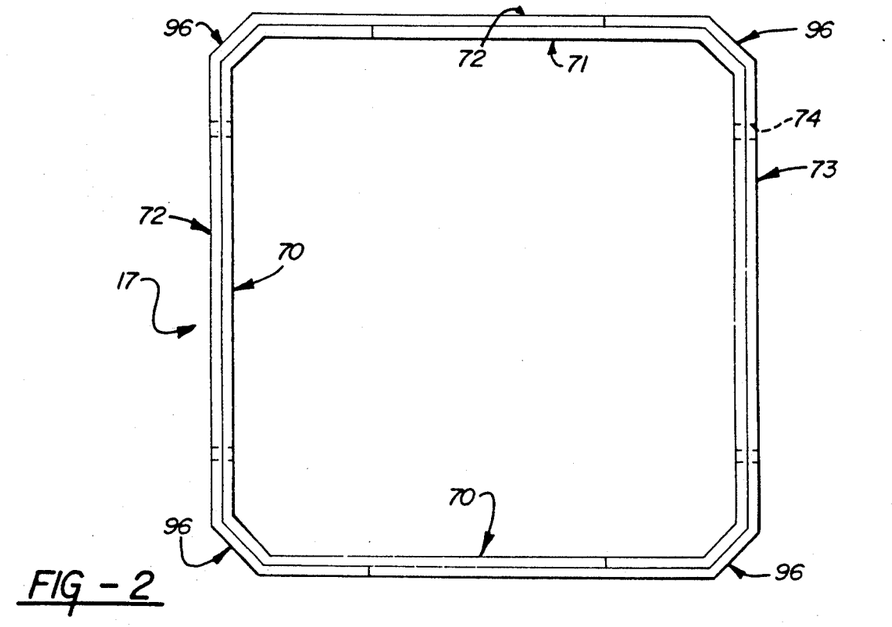
FIG. 2 is a top plan view of a sleeve assembly utilized in the invention container.
Figure 6:
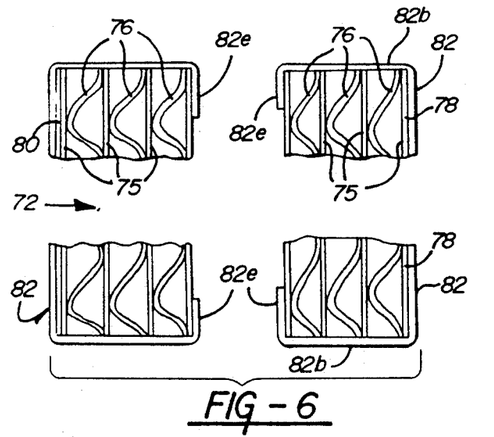
FIG. 6 is a fragmentary cross sectional view illustrating details of the invention sleeve assembly.

Sleeve assembly 17 is formed from a pair of inner cardboard panels or strips 70,71 and a pair of outer cardboard panels or strips 72,73. Panels 70-73 are preferably formed of three-ply corrugated material such as is commercially available from Tri-Wall Containers Inc. Each panel 70-73 is formed in known manner of a plurality of flat primary cardboard sheets 75 interspersed with and adhesively secured to a plurality of corrugated cardboard sheets 76 with flat primary sheets 75 disposed on the inner and outer surfaces respectively of the panel so as to form a multi-layer sandwich construction. In addition, a flat auxiliary cardboard sheet 78 is secured to the inboard face of inner panels 70,71 and a flat auxiliary cardboard sheet 80 is secured to the outboard face of outer panels 72,73.

By way of example, auxiliary sheets 78,80 and the sheets 75 forming the outer faces of each panel may have a weight of 96 pounds per 1000 square feet and a thickness of 0.026 inches; intermediate sheets 75 may have a weight of 69 pounds per 1000 square feet and a thickness of 0.019 inches; and corrugated sheets 76 may have a weight of 33 pounds per 1000 square feet and a thickness of 0.011 inches.

Figure 7:
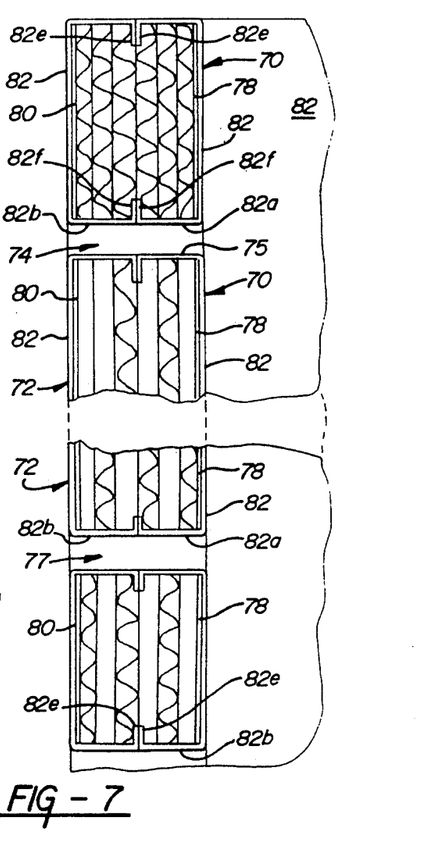
FIG. 7 is a fragmentary view illustrating further details of the invention sleeve assembly.

Panels 70-73 are configured along their lower edges in a manner to match the configuration of the pallet 14. Specifically, a plurality of cut-outs 70a, 71a, 72a, 73a are provided in circumferentially spaced fashion around the lower peripheral edge of the panels to define a plurality of legs 70b, 71b, 72b, 73b configured to fit respectively within the hollow legs 22, 24 and 26 of the pallet with the edges 70c, 71c, 72c, 73c at the tops of the cutouts positioned in groove means 40 defined by the pallet.

A plurality of slots or apertures 74 are provided at circumferentially spaced locations along the upper edge portions of panels 70-73 and a corresponding plurality of slots or apertures 77 are provided along the lower peripheral edges of panels 70-73 proximate and above edges 70c, 71c, 72c, 73c.

The methodology of performing the invention sleeve assembly is seen in FIG. 11. Specifically, FIGS. 11(a)-11(j) illustrate the formation of the outer panel 72; FIGS. 11(k) and 11(l) illustrate the combination of outer panel 72 with inner panel 70 to form a panel subassembly; FIGS. 11(m) and 11(n) illustrate the formation of first and second partial sleeve assemblies 86 and 88; and FIGS. 11(p) and 11(q) illustrate the combining of the partial sleeve assemblies 86 and 88 to form the final sleeve assembly 17.

Figures 11A, 11C:
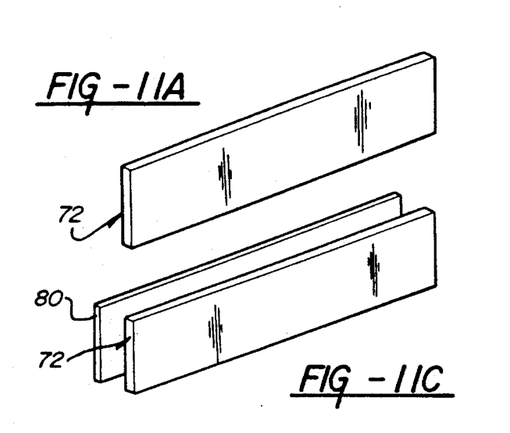
FIG. 11 illustrates steps in the methodology employed in forming the invention container.
Figure 11B:
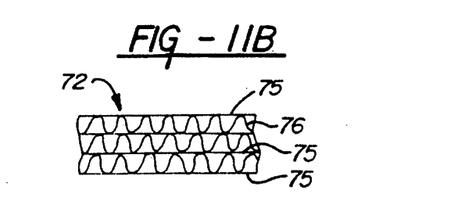
Figure 11D:
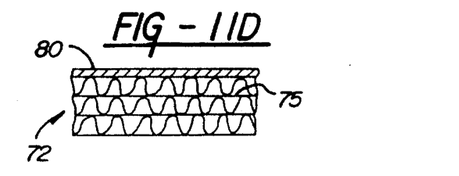
Figures 11E, 11F, 11G, 11H, 11I, 11J, 11K, 11L, 11M, 11N:
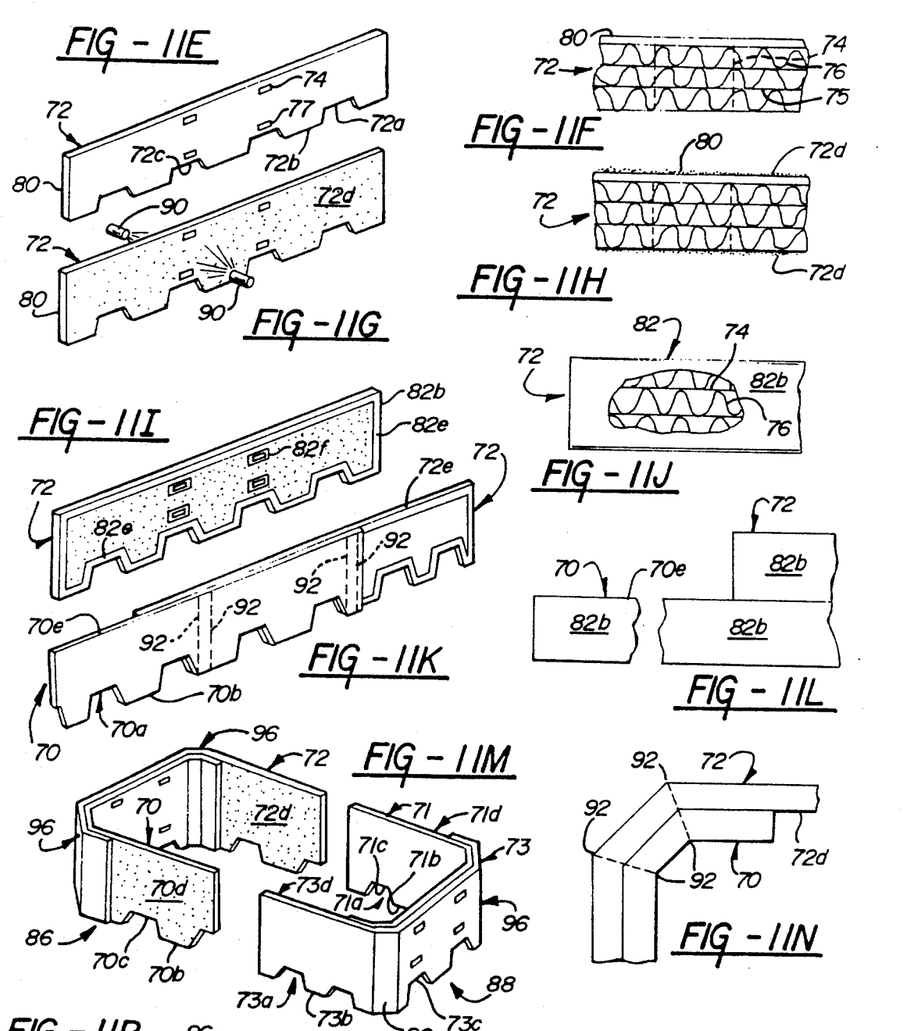
Figure 11P:
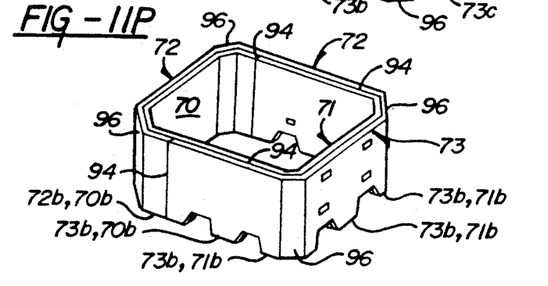
Figure 11Q:
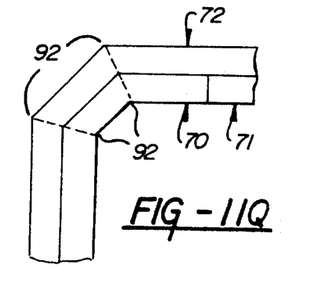

According to the invention methodology, a sheet or panel 72 of standard triple wall corrugated construction is provided including flat sheets 75 interspersed with corrugated sheets 76; an auxiliary or supplemental cardboard sheet 80 is adhesively secured to the outer face of panel 72 so as to combine with the outer sheet 75 to provide a reinforced outer skin for the panel; the panel is suitably die cut to provide slots 74,77 and cutouts 72a; spray guns 90 are utilized to adhesively spray the inner and outer faces of the panel with a heat activated cement (such for example as the type available from PPG Adhesives and Solvents of Madison Heights, Mich. as Part No. HC7111) to provide a cement coating 72d entirely covering the inner and outer faces of the panel; a sheet of vinyl material 82 is heated and applied in a back forming vacuum operation (see also FIG. 12) to the outer face of the panel to form a vinyl coating entirely covering the outer face of the panel and extending over the upper and lower and left and right end edges of the panel and lining the apertures 74,77 of the panel; heat is applied to the inner face of panel 72 and to the inner face of panel 70 (which has been formed in the same manner as panel 72, according to the steps illustrated in FIGS. 11(a)-11(j), to include auxiliary supplemental cardboard sheet 78 and outer sheet of vinyl material 82) to activate the cement coating 72(d),70(d) and the panel interfaces are pressed together to form a panel subassembly with panels 70 and 72 staggered so as to form a free end portion 72e of panel 72 and a free end portion 70e of panel 70; the panel subassembly is scored along lines 92 and folded along lines 92 to form the sleeve subassembly 86 seen in FIG. 11m; sleeve subassembly 88 is formed from panel 71 and 73 following steps 11(a) through 11(n); and heat is applied to the exposed cement coating 70d, 71d, 72d, and 73d and the sleeve subassemblies are brought together in nesting interfitting fashion to form the final sleeve assembly 17 as seen in FIG. 11(p).

In the final sleeve assembly, the inner and outer faces as well as the upper and lower annular edges of the sleeve assembly are totally sealed by the vinyl layers 82 so that the sleeve assembly is virtually moisture impervious; the auxiliary sheets 80 on the outer annular surface of the sleeve assembly coact with the outer sheets 75 of the outer panels to form a strong outer skin capable of withstanding substantial tension loading; the inner auxiliary sheets 78 coact with the inner sheets 75 of the inner cardboard panels to provide a strong inner skin for the sleeve assembly capable of withstanding high compressive loading; and the seams 94 between the abutting vertical end edges of the panels 70, 71, 72 and 73 are staggered or circumferentially spaced around the circumference of the sleeve assembly to increase the structural rigidity of the sleeve assembly.

Note that score lines 92 are provided in circumferentially spaced pairs so that angled corner portions 96 are provided in each sleeve subassembly and four angled corner portions 96 are provided in the final sleeve assembly.

Figure 12:
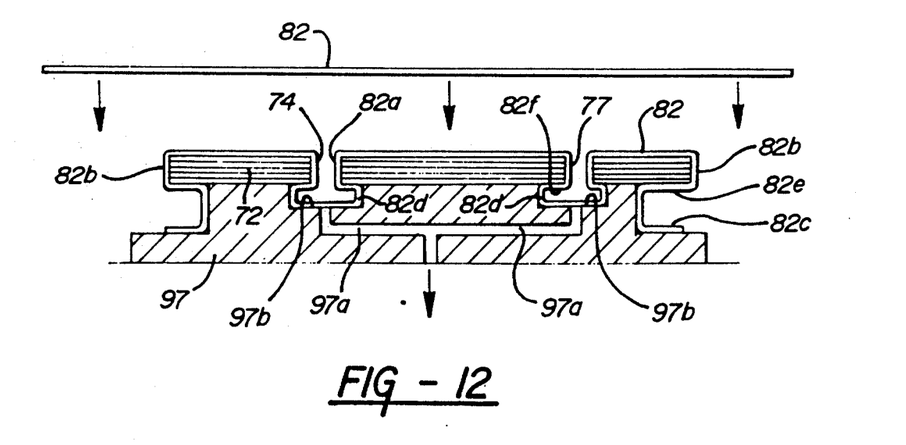
FIG. 12 illustrates further details of one of the steps of the methodology illustrated in FIG. 11.

The manner in which the vinyl sheet or skin 82 is back formed to the various panels is best seen in FIG. 12. Specifically, the panel is positioned over a back forming die 97 and the vinyl sheet 82 is heated in an oven and is positioned over the upper face of the panel whereafter vacuum is applied to the upper face of the die via channels 97a opening in cavities 97b underlying apertures 74 and 76 so as to suck the heated sheet downwardly into firm compliance with the upper face of the panel, suck portions 82a into the apertures 74,77 to form a lining for the apertures, and suck portions 82b downwardly over the end edges of the panel and around the inner or under face of the panel, following which the excess vinyl portions such as seen at 82c and 82d may be suitably trimmed to provide the final vinyl covered panel construction including an edge portion 82e extending around the inner face of the panel, including around the cutouts in the lower edge of the panel, and an annular border portion 82f on the inner face of the panel around the apertures 74 and 77.

It will be understood that the heated vinyl sheet 82 activates the heat activated cement coating 72d so that the vinyl sheet is firmly and adhesively secured to the panel.

It will further be understood that the vinyl sheet 82 is stretchable to allow the sheet to be sucked downwardly into the aperture 74 and 77 and allow the sheet to be wrapped around the end edges of the panel so that the thickness of the vinyl coating on the panel varies depending upon the extent to which the vinyl has been stretched to achieve its final disposition with respect to the panel.

It will further be understood that the apertures in the upper and lower edge portions of the various panels are arranged such that they are mutually aligned in the final sleeve assembly and, similarly, the cutouts in the lower edges of the various panels are arranged such that the cutouts are mutually aligned in the final sleeve assembly.

The final sleeve assembly, as seen in FIG. 11(p), may now be utilized in cooperation with the pallet 14. Specifically, as the sleeve assembly 17 is lowered into position over the pallet 14, the leg portions of the sleeve assembly, formed by the joined leg portions 70b, 71b, 72b, 73b of the individual panels, fit respectively into the hollow legs of the pallet and rest on the bottom walls of the pallet legs; the cut out edge portions of the sleeve assembly, formed by the joined cut out edge portions 70c, 71c, 72c, 73c of the individual panels, fit into and rest against the bottom edges of the groove means 40 with the apertures 77 aligned with the latch members 46 of the respective latch assemblies; and the angled corner portions 96 of the sleeve fit conformingly into and against angled rim corner portions 42b so that the angled rim corner portions of the pallet embrace the outer surfaces of the lower edge portions of the angled corner portions of the sleeve assembly.

Following placement of the sleeve assembly into the pallet, the latch members 46 may be moved outboard, utilizing handles 46b, to pass the outboard tips of the latch members through the apertures 77 and preclude inadvertent separation of the sleeve assembly from the pallet.

The seating of the lower edges of the leg portions of the sleeve assembly on the bottom walls of the pallet legs also has the desirable effect of transferring compressive loads from stacked containers directly to the base or support surface for the container, as explained more fully in U.S. Pat. Nos. 4,550,830 and 4,765,252 assigned to the assignee of the present application.

As best seen in FIG. 5, the thickness of the sleeve assembly, as defined by the combined thicknesses of panels 70,72 and 71,73, as augmented by auxiliary panels 78,80 and vinyl sheets 82, approximates the thickness of the groove means 40 at the bottoms of the groove means so that the cutout edges 70c, 71c, 72c, 73c of the sleeve assembly fit snugly in the groove means to preclude unwanted lateral movement of the sleeve assembly relative to the pallet.

Following the loading of the container with a suitable bulk material, lid 16 is placed over the upper edge of the sleeve assembly with the upper edge of the sleeve assembly fitting snugly in groove 60, including fitting of angled corner portions 96 into and against angled lid corner rim portions 58b, whereafter the latch members 46 of the latch assemblies of the lid may be moved outwardly in detenting fashion to move the latch members into the aligned apertures 74 and preclude inadvertent removal of the lid from the container. It will be understood that the lid acts to constrain the upper circumferential edge of the sleeve assembly against outward, bulging movement in response to the pressures generated by the stored bulk materials but that, due to the burst strength of the sleeve assembly, the container may be fully loaded with bulk material with the lid removed without fear of bulging of the upper edge of the sleeve assembly so that the container may, if desired, be loaded, transported, stored and the like without lid 16 in place.

An alternate methodology for performing the invention sleeve assembly is illustrated in FIGS. 13-21. The alternate methodology of FIGS. 13-21 provides precise definition for the creases at the corners of the sleeve and allows the sleeve to readily assume a flat folded configuration for purposes of storage and return shipment of the sleeve.

In the methodology of FIGS. 13-21, the four panels 70-73, after receiving the auxiliary cardboard sheets 78,80 and the vinyl layers 82 as described with reference to FIG. 11, are adhesively secured together in staggered fashion to form a single flat panel assembly 100.

Figure 13:
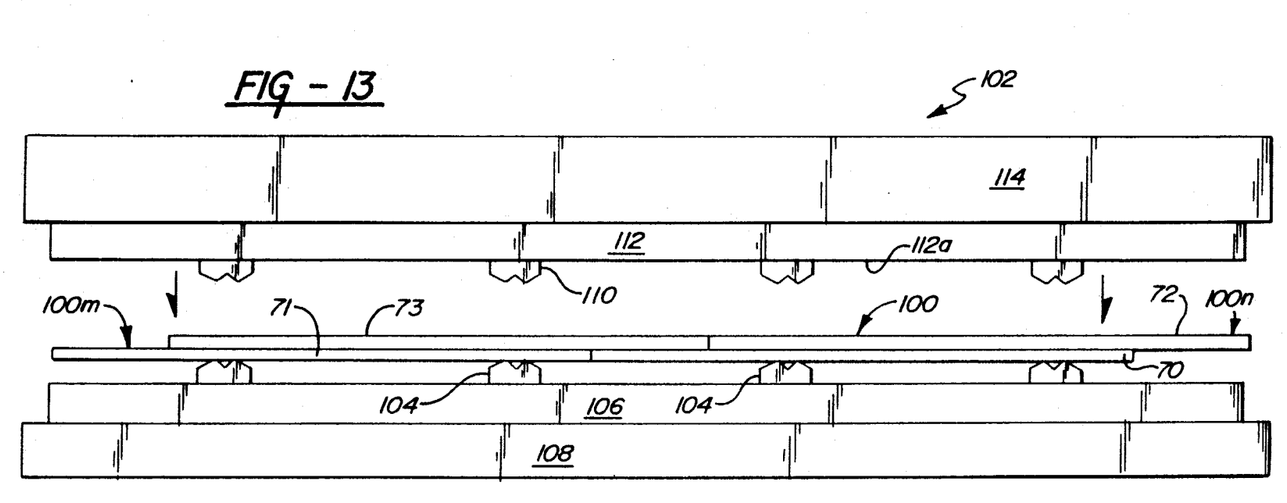
FIGS. 13-21 illustrate apparatus and steps employed in an alternate methodology for forming the invention container.

The flat panel assembly 100 is then placed in a press 102 with the assembly resting on die bars 104 supported and secured in longitudinally spaced location along a lower platen 106 supported on the bed 108 of the press. Each die bar is configured to define a pair of creases in the panel assembly 100 extending across the entire width of the panel assembly from top edge to bottom edge. The die bars accordingly have a length at least equal to the width of the panel assembly.

Figure 14:
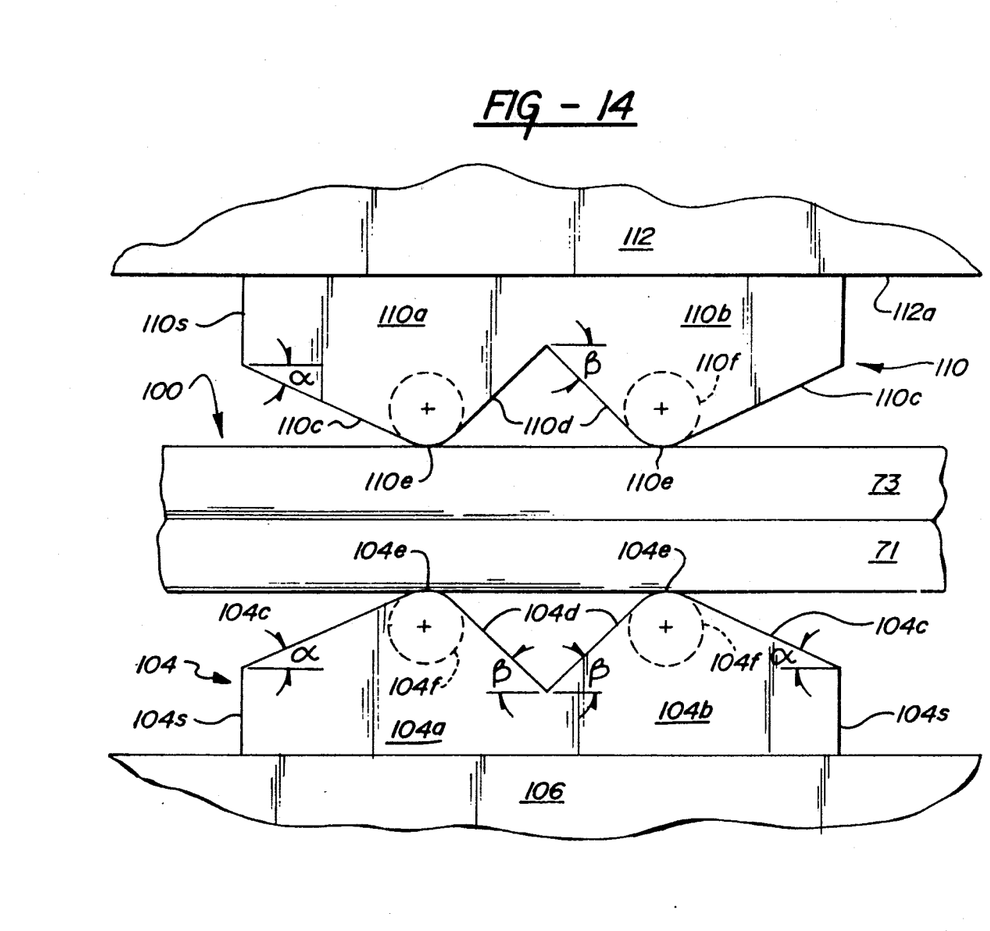

The die bars are formed of a suitable ferrous material and each include, as viewed in FIG. 14, a left portion 104a and a right portion 104b. Each portion defines a relatively shallow face 104c and a relatively steep face 104d with each shallow face 104c and each steep face 104d interconnected by a radiused surface 104e. The shallow faces 104c may for example form an angle $\alpha$ of 25° with the horizontal; the steep faces 104d may form an angle $\beta$ of 45° with the horizontal; the radiused surfaces 104e may be formed by circles 104f having a diameter of 0.625 inches; the center lines of the circles 104f may be spaced a distance of two inches; the width of the die bar between side edges 104g may be five inches; and the total height of the die bar may be 1.25 inches.

Die bars 110 are secured to the lower face 112a of the upper platen 112 of the press in longitudinally spaced relation corresponding to the longitudinally spaced relation of the die bars 104 on the lower platen. Die bars 110 are identical to die bars 104 with the exception that they are inverted with respect to the die bars 104 and have a somewhat greater height than the die bars 104. As with the die bars 104, the steep faces 110d of the die bars 110 form an angle $\beta$ of 45° with the horizontal; the shallow faces 110c form an angle $\alpha$ of 25° with the horizontal; the radiused surfaces 110e are defined by circles 110f having a diameter of 0.625 inches; the centers of circles 110f are separated by a distance of 2 inches; and the die bars have a width between side edges 110g of 5 inches. Die bars 110 may have a height of 2.5 inches.

Figure 15:
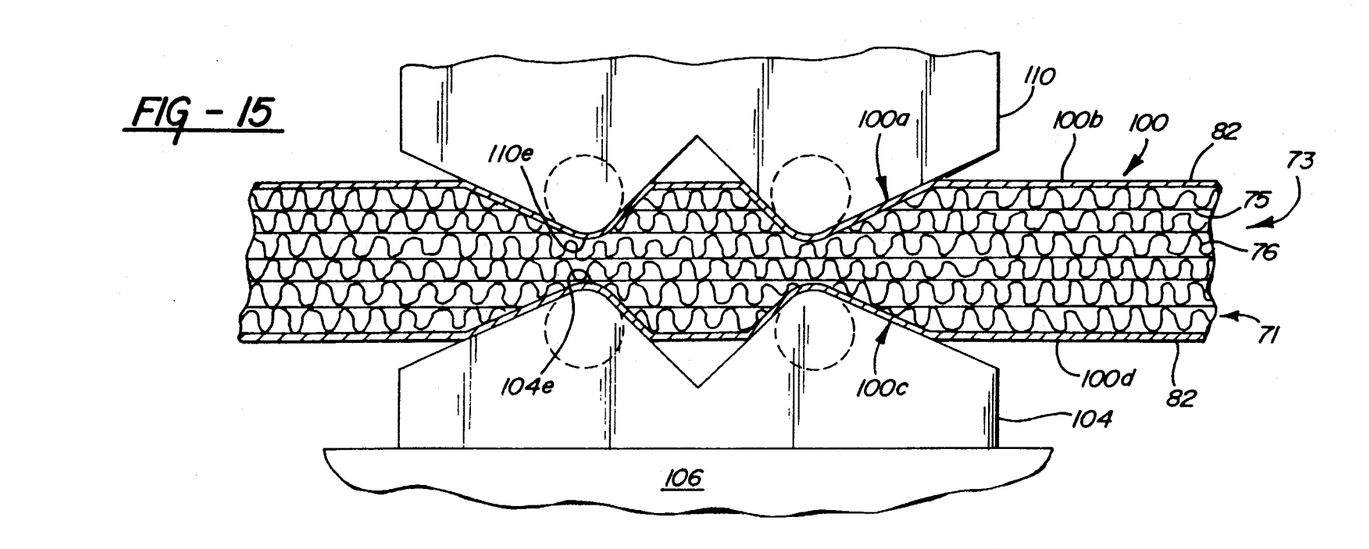

As shown, die bars 110 are positioned in precise vertical alignment with the respective die bars 104 so that the radiused surfaces 104e defined by a die bar 104 respectively confront the radiused surfaces 110e of the corresponding die bar 110. With this arrangement, and as best seen in FIG. 15, as the upper die bars 110 are lowered by lowering of the head 114 of the press, the panel assembly 100 is selectively crushed between the die bars 110 and 104 with each vertically aligned pair of die bars 104 and 110 coacting to define a pair of parallel creases 110a in the upper or outer face 100b of the panel assembly defining a hinge section 100j therebetween, and a corresponding pair of parallel creases 100c in the lower or inner face 100d of the panel assembly defining a hinge section 100k therebetween. The creases are provided by crushing and flattening the flat and corrugated sheets 75,76 of the cardboard panels with the total crush reducing the panel assembly 100 to a thickness of less than ½ of its normal or original thickness. For example, if the panel assembly 100 is formed by two corrugated triple wall cardboard panels of 0.625 inches thickness for a total panel assembly thickness of 1.25 inches, the crushed thickness of the panel assembly, as measured between radiused surfaces 110e and 104e, may be 0.5 inches.

Figure 16:
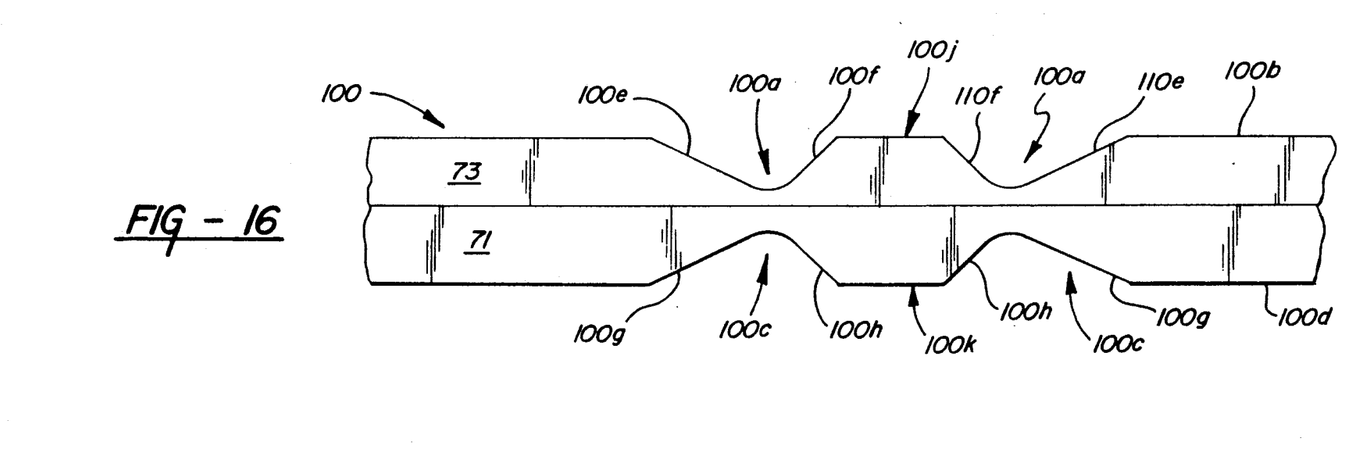

Each crease 100a, 100c formed respectively in the upper and lower face of the panel assembly will be seen to have a configuration generally corresponding to the configuration of the combined faces 110c, 110d and 110e of the die bars 110 and of the combined faces 104c, 104d and 104e of the die bars 104 except that all of the length of faces 110c, 110d and 104c, 104d are not duplicated in the creases. However, because of the different angles of the faces of the die bars, the creases 100a include a relatively long face 100e and a relatively short face 100f and the creases 100c include a relatively long face 100g and a relatively short face 100h. Since faces 104c and 104d, as well as faces 110c and 110d, define an included angle of 110° it will be seen that the faces 100e, 100f of the creases 100a and the faces 100g, 100h of the creases 100c also define an included angle of approximately 110° so that each pair of creases on each face of the panel assembly together define an included angle of 220°.

Figure 17:
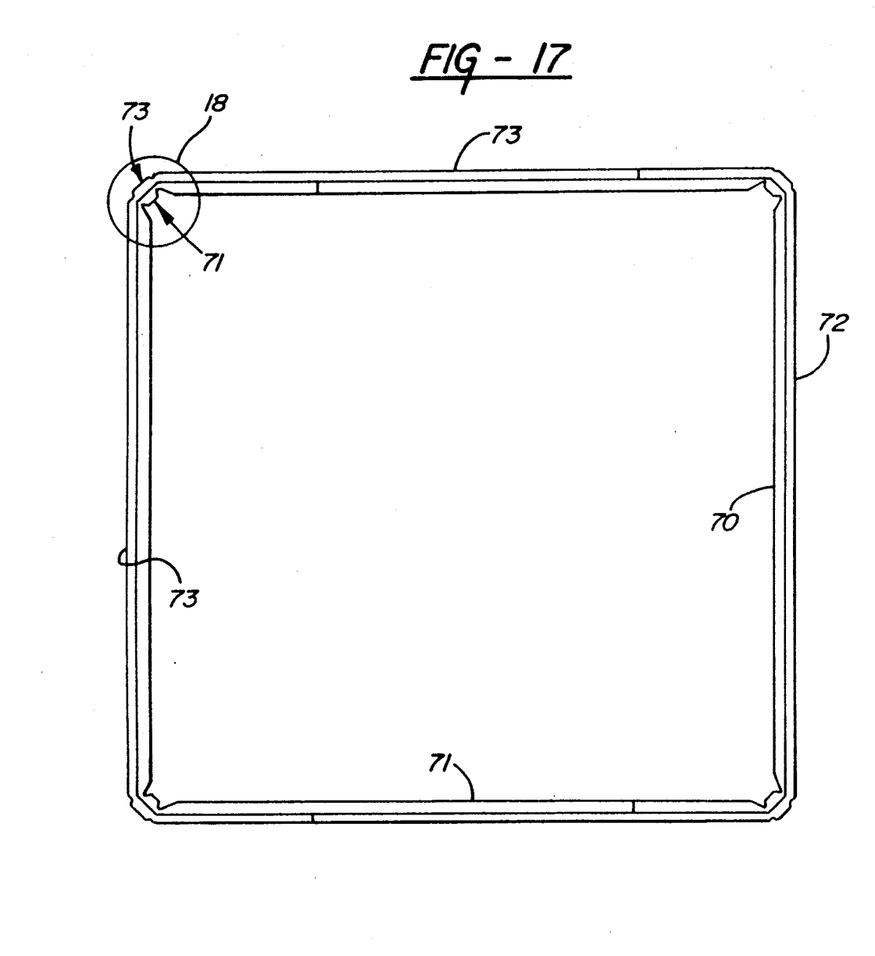
Figure 18:
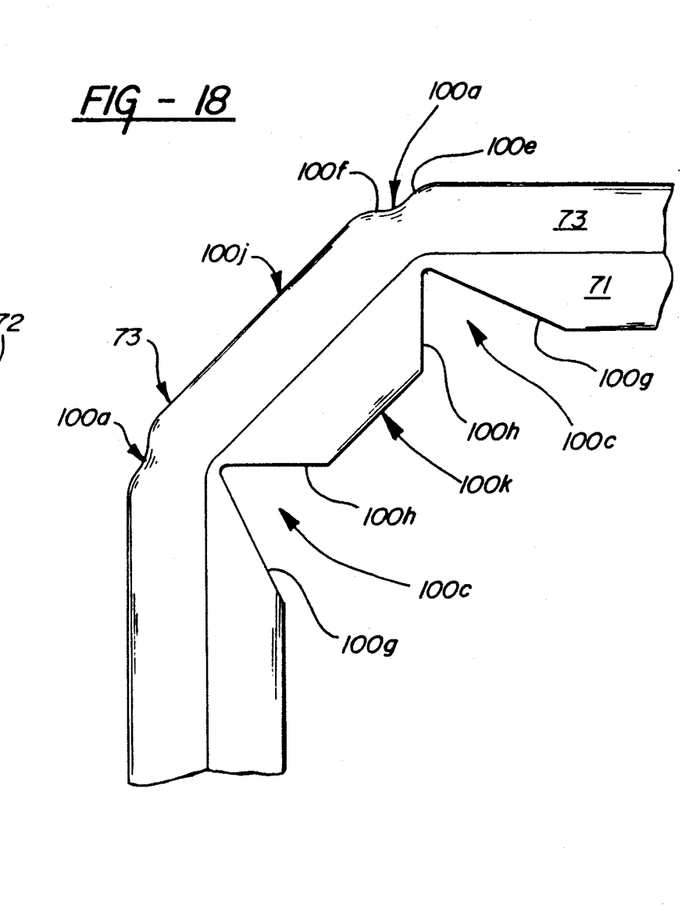

Following the creasing operation utilizing the press 102, the panel assembly is suitably folded to form the sleeve assembly seen in FIG. 17 with the overlapping end sections 100m and 100n of the panel assembly 100 secured together by a suitable adhesive. As best seen in FIG. 18, the creases 100a, 100c allow the panel assembly to readily assume the corner configuration seen in FIGS. 17 and 18. In the corner configuration, it will be seen that the creases 100c on the inside of the sleeve have closed up considerably but still define an angle between faces 100g, 100h and that the creases 100a on the outer face of the sleeve have flattened considerably and have a shallow configuration.

Figures 19, 21:
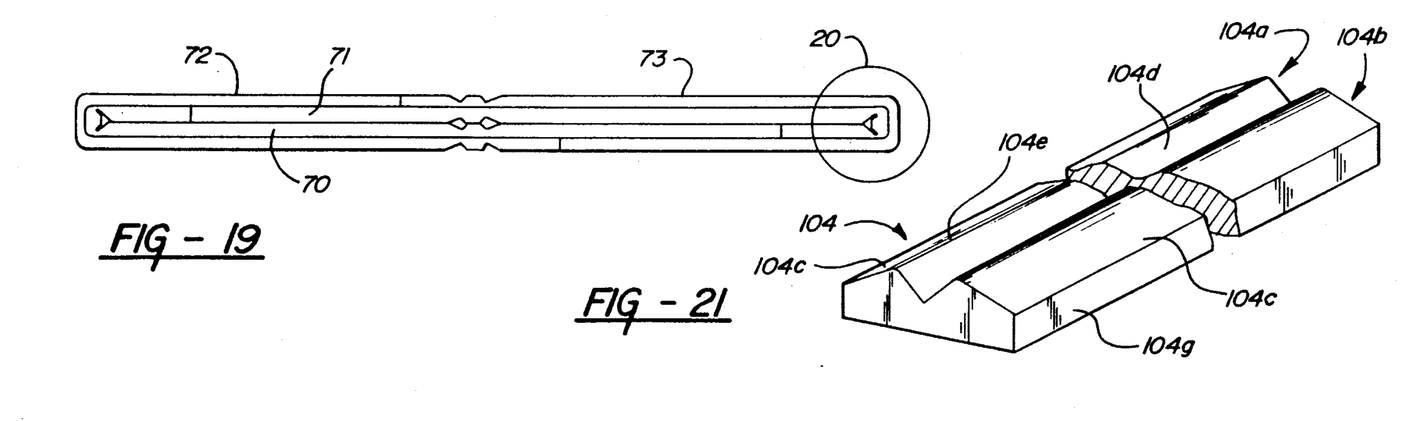
Figure 20:
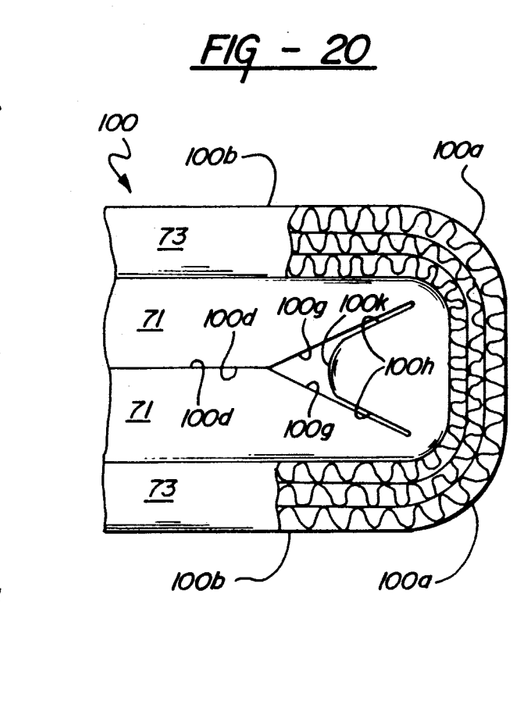

The creases 100a, 100c also and importantly allow the sleeve to be folded totally flat for purposes of storage and shipment. The collapsed or flattened configuration of the sleeve is seen in FIGS. 19 and 20. With particular reference to FIG. 20, it will be seen that the creases 110a and 110c allow the sleeve to be readily folded through 180° so as to allow the sleeve to assume a totally flat configuration with the creases 100c on the inner side of the sleeve substantially totally collapsing to allow the 180° folding of the sleeve and with the creases 110a on the outside of the sleeve essentially disappearing. Specifically, the total 220° included angle defined by a pair of creases 102c allows the sleeve to be folded readily through 180° at selected corners and the relatively long dimension of the outboard crease faces 100g as compared to the relatively short dimension of the inboard crease faces 100h allows the outboard faces 100g to extend, in the folded configuration seen in FIG. 20, inwardly beyond the inner ends of the faces 100h so as to allow the inner faces 100d of the adjacent sections of the panel assembly to assume an essentially flat, contiguous relative relationship so as to further facilitate the total, flat folding of the sleeve. The folding of the sleeve is further facilitated by the partial crushing of the hinge sections 100k between adjacent creases 100c so that the hinge sections assume a relatively rounded or humped configuration, as seen in FIG. 20, as compared to the plateau configuration seen in FIG. 16. The folding of the sleeve is further facilitated by the creases 100a in the outside face of the sleeve which act to facilitate the thinning out and elongating of the outer panel to allow the outer panel to wrap readily around the inner panel in the collapsed or folded configuration of the sleeve.

The described creasing arrangement not only allows the sleeve to be readily collapsed to a flat configuration, it also avoids a thickening or swelling of the sleeve at the collapsed corners. Specifically, in the illustrated embodiment, the thickness of the folded sleeve is approximately 2½ inches and this thickness extends for the entire length of the collapsed sleeve rather than increasing or swelling at the collapsed corners to a dimension substantially in excess of 2½ inches. Being able to hold a constant thickness for the collapsed sleeve through its entire length allows the sleeve to be stacked in multiple layers with each collapsed sleeve resting firmly and totally on the underlying sleeve with no space therebetween and with each sleeve occupying, in the stack, only 2½ inches.

It should also be understood that the distance between the center lines of circles 104f, 110f (2 inches in the disclosed embodiment), the length of the long crease faces 100e, 100g as compared to the length of the short crease faces 100f, 100h, and the angles of the various crease faces (as determined by the angles α and β of the die bars) are all critical, on a comparative basis, to allowing the sleeve to readily collapse and to ensuring that the collapsed sleeve is not thickened or swollen at the collapsed corners.

The invention container, although formed from inexpensive cardboard and plastic materials in a relatively inexpensive process, provides a container having extremely high sidewall strength, so as to be eminently suitable for use in storing bulk materials, and having a virtually moisture impervious construction, so as to enhance its durability and allow outdoor use and storage. The sealed aspect of the sleeve also precludes entry of contaminants, such as food particles, into the flutes of the cardboard structures so as to enhance the usability and reusability of the invention container in applications, such as food handling, where sanitation is important, and the unique methodology for forming specific creases at specific locations along the sleeve allows the sleeve to be folded totally flat for purposes of storage and shipment despite the rather bulky aspect of the sleeve due to its composite wall construction.

Whereas the preferred embodiments of the invention have been illustrated and described in detail, it will be apparent that various changes may be made in the disclosed embodiments without departing from the scope or spirit of the invention.

I claim:
1. A container comprising:
 a plastic pallet defining upwardly opening groove means around the periphery of the upper face of the pallet;
 a tubular sleeve assembly comprising inner and outer tubular sleeves respectively formed of first and second corrugated cardboard structures with said inner sleeve positioned telescopically within said outer sleeve and adhesively secured at its outer face to the inner face of said outer sleeve to form a composite sleeve assembly having a thickness approximately the width of said groove means so that the lower peripheral edge of said sleeve assembly may be received snugly in said groove means to define said container.

2. A container according to claim 1 wherein:

each said corrugated cardboard structure comprises a multiple ply cardboard structure including a plurality of flat primary cardboard sheets interspersed with a plurality of corrugated cardboard sheets with flat primary inboard and outboard sheets disposed on the inner and outer surfaces respectively of each cardboard structure.

3. A container according to claim 1 wherein:

said pallet includes downwardly extending legs defining downwardly opening tunnels therebetween extending across the lower face of the pallet for receipt of the forks of a forklift truck; and said groove means are defined around the periphery of the upper face of said pallet over said tunnels.

4. A container comprising:

a plastic pallet defining upwardly opening groove means around the periphery of the upper face of the pallet; and a tubular sleeve assembly comprising inner and outer tubular sleeves respectively formed of first and second corrugated cardboard structures with said inner sleeve positioned telescopically within said outer sleeve to form a composite sleeve assembly having a thickness approximating the width of said groove means so that the lower peripheral edge of said sleeve assembly may be received snugly in said groove means to define said container;

each of said corrugated cardboard structures comprising a multiple ply cardboard structure including a plurality of flat primary cardboard sheets interspersed with a plurality of corrugated cardboard sheets with flat primary inboard and outboard sheets disposed on the inner and outer surfaces respectively of each cardboard structure;

said outer cardboard structure further including a flat auxiliary cardboard sheet secured to the outboard sheet of said outer cardboard structure and said inner cardboard structure further including a flat auxiliary cardboard sheet secured to the inboard sheet of said inner cardboard structure.

5. A container comprising:

a plastic pallet defining upwardly opening groove means around the periphery of the upper face of the pallet; and a tubular sleeve assembly comprising inner and outer tubular sleeves respectively formed of first and second corrugated cardboard structures with said inner sleeve positioned telescopically within said outer sleeve to form a composite sleeve assembly having a thickness approximating the width of said groove means so that the lower peripheral edge of said sleeve assembly may be received snugly in said groove means to define said container;

said sleeve assembly further including a plastic layer secured to the inner annular surface of said inner sleeve and a plastic layer secured to the outer annular surface of said outer sleeve.

6. A container according to claim 5 wherein:

said plastic layers further cover the upper and lower annular end edges of said sleeve assembly.

7. A container comprising:

a plastic pallet defining upwardly opening groove means around the periphery of the upper face of the pallet; and a tubular sleeve assembly comprising inner and outer tubular sleeves respectively formed of first and second corrugated cardboard structures with said inner sleeve positioned telescopically within said outer sleeve to form a composite sleeve assembly having a thickness approximating the width of said groove means so that the lower peripheral edge of said sleeve assembly may be received snugly in said groove means to define said container;

each said sleeve including four side portions together defining a rectangle and four angled corner portions at the four corners of the sleeve so that said sleeve assembly includes four side portions in the form of a rectangle and four angled corner portions, each angled corner portion lying in a plane that intersects the planes of the adjacent side portions at a bias and respectively joined to each adjacent side portion by a crease so that each angled corner portion is bounded by circumferentially spaced parallel creases;

said pallet defining an upwardly opening rim extending around the periphery of the pallet and having a continuous circumferential inboard face forming the outer boundary of said groove means and sized to telescopically receive said sleeve assembly and including four side portions sized to respectively embrace the outer surfaces of the lower edge portions of the four side portions of the sleeve assembly and four corner portions sized to respectively embrace the outer surfaces of the lower edge portions of the four angled corner portions of the sleeve assembly.

8. A method of forming a container for bulk materials comprising the steps of:

providing a cardboard panel structure;

adhesively securing a sheet of plastic material to at least one side face of the panel structure;

forming the cardboard structure into a tubular sleeve;

forming a plastic pallet having a plurality of upwardly facing groove means spaced circumferentially around the periphery of the upper face of the pallet, sized to accommodate respective portions of the lower peripheral edge of said sleeve, and a plurality of upwardly facing receiving surfaces interspersed with the groove means and spaced below the plane of the groove means;

providing a plurality of circumferentially spaced cut outs in the lower edge of said sleeve corresponding in size and circumferential disposition to the circumferentially spaced groove means on the upper face of the pallet; and positioning the lower peripheral edge of said sleeve on said receiving means, with the tops of the cut outs seating on the respective groove means, to form the bulk container.

9. A method of forming a container for bulk materials comprising the steps of:

providing a first strip of corrugated cardboard material;

providing a second strip of corrugated cardboard material;

forming said first strip into a first tubular sleeve;

forming said second strip into a second tubular sleeve;

positioning said second tubular sleeve telescopically within said first tubular sleeve to form a composite sleeve assembly;

adhesively securing the outer face of said second tubular sleeve to the inner face of said first tubular sleeve;

forming a plastic pallet having upwardly opening groove means around the periphery of the upper face of the pallet having a width approximating the thickness of said composite sleeve assembly; and positioning the lower peripheral edge of said composite sleeve in said pallet groove means to form the bulk container.

* * * * *